(No Model.)
M. W. HENIUS.
CORSET CLASP.
No. 385,710. Patented July 10, 1888.
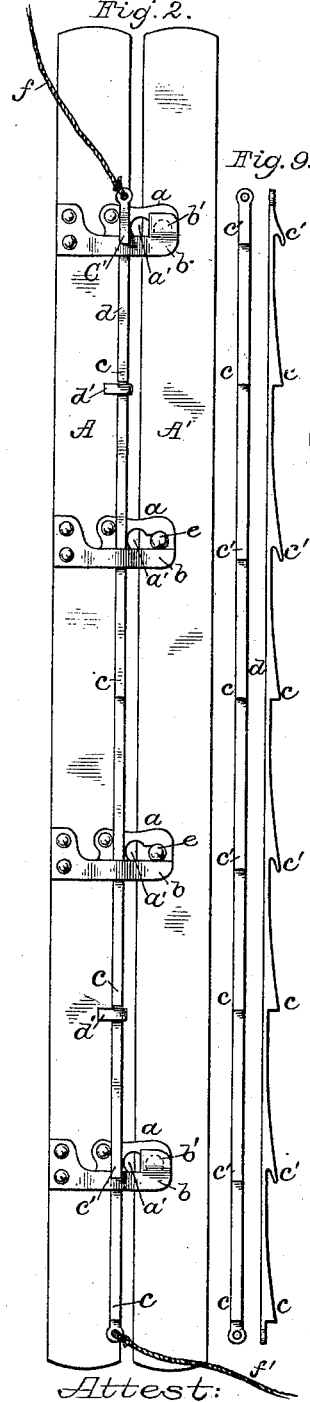
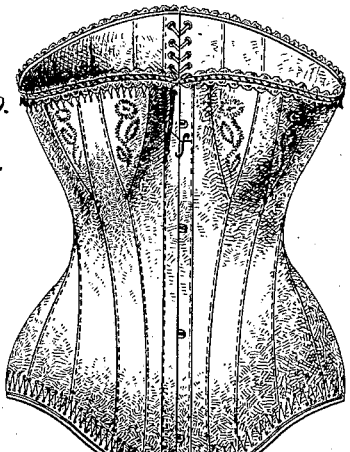
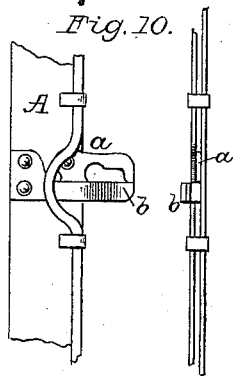
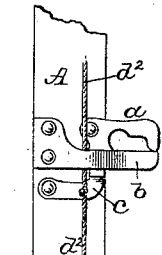
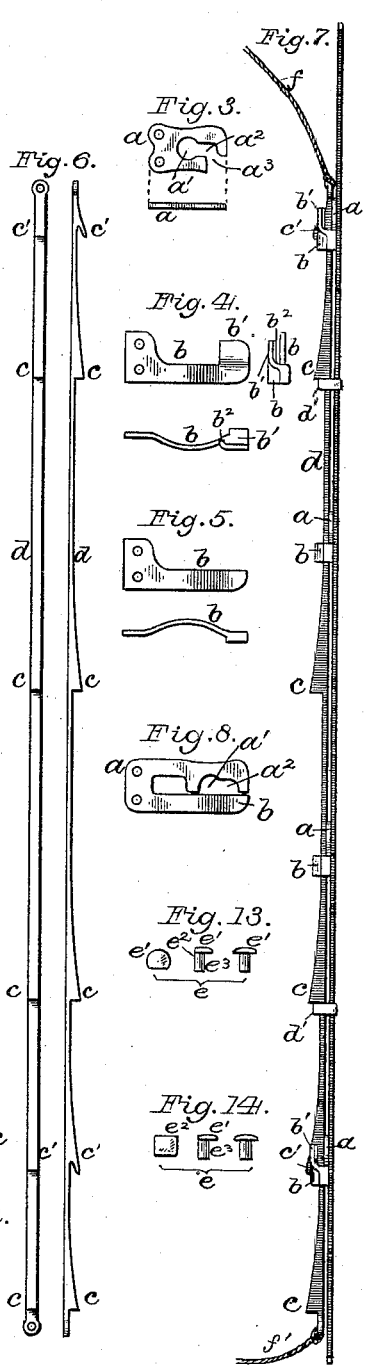
Attest:
Philip F. Larner
Lowell T. Bartle
Inventor:
Max W. Henius
By Wm C. Wood
Attorney.
N. PETERS, Photo-Lithographer, Washington, D. C.

United States Patent Office.

MAX W. HENIUS, OF BRIDGEPORT, CONNECTICUT.

CORSET-CLASP.

SPECIFICATION forming part of Letters Patent No. 385,710, dated July 10, 1888.

Application filed July 25, 1884. Serial No. 138,751. (No model.)

*To all whom it may concern:*

Be it known that I, MAX W. HENIUS, of Bridgeport, in the county of Fairfield and State of Connecticut, have invented certain new and useful Improvements in Corset-Clasps; and I do hereby declare that the following specification, taken in connection with the drawings furnished and forming a part of the same, is a clear, true, and complete description of the several features of my invention.

A corset provided with clasps embodying my said improvements can be applied to and removed from the body as with ordinary clasps by forcing the edges of the two steels toward each other, for enabling the heads of the studs to be either entered or released by way of the usual large or receiving eyes of the clasp-plates; but said corset can also be removed by a simultaneous release of the several studs from all of the retaining slots or eyes of the clasp-plates while the corset is in a distended condition.

Various organizations have been heretofore devised for effecting the simultaneous release of the studs from the several clasp-plates—as, for instance, in one form of clasp a series of hooks pivoted flatly to the front surface of the corset-steel have been coupled together by a cord or rod, so as to enable said hooks to be simultaneously vibrated on their pivots in a plane parallel with the front surface of the steel, for causing them to engage with or be released from the studs projecting from the second steel.

Another form of clasp embodies a series of clasp-plates which are divided and are so mounted upon the steel that one part serves as a stationary jaw and the other as a movable jaw, the shank of a stud beneath its flanged head being embraced between them. In all cases this last-named variety of clasp plates have had their movable parts or jaws arranged to be moved in a plane parallel with the stationary jaws, and also with the front surfaces of the steels—as, for instance, in some cases said movable jaws have been pivoted upon the steel so as to swing toward and from the stationary jaws, and in other cases said movable jaws have had a sliding movement either up and down the steel or outward from it; but in both instances they move in a plane parallel with the surface of the steel, as well as parallel with the stationary jaw, and in said prior clasps the movable jaws were so connected with a sliding rod or plate that the longitudinal movement of the latter imparted movement to the movable jaws, both for opening and closing the clasps.

The objects of my invention are to secure a more reliable stud-retaining capacity than has, as I believe, been heretofore obtained in corset-clasps of this general class; also, to relieve the movable parts from undue strain while the corset is in use; and, further, to enable the prompt release of the studs with ease and facility. For the attainment of these ends I have devised a novel clasp-plate having a receiving-eye, a retaining-slot or small eye, and a stud-releasing gateway at the outer end of said slot, guarded by a spring, which operates as a gate and vibrates in a plane at right angles to said clasp-plate and to the steel on which said plate and spring are mounted, so that when a stud is to be released from said retaining-slot the movement of the spring-gate opens the gateway and permits the stud to pass beneath said gate and outwardly from the retaining slot or eye. This spring gate may be normally closed or normally open without departure from my invention—in other words, so that the spring when free will close said gateway and open it when lifted, or so that the spring when forcibly depressed will close said gateway and open the same when released from pressure, said springs in either case being organized by me in a novel manner, so as to be simultaneously controlled by inclined planes or wedges, which are moved in the plane of the steel on which the springs are mounted, and in contact with said springs by means of a sliding bar, or a rod, or a cord, as may be desired.

To more particularly describe my invention, I will refer to the accompanying drawings, and after a detailed description of the clasps therein illustrated the several features deemed novel will be specified in the several claims hereunto annexed.

Figure 1 is a front view of a corset provided with my novel clasp. Fig. 2 is a front view of a pair of detached corset-steels embodying my improvements. Fig. 3 is a front and edge view of the gated eye-clasp plate detached. Fig. 4, in side and edge views, illustrates a detached spring-gate as when constructed to operate as a lock for preventing the stud from passing toward the large or receiving eye of the gated plate. Fig. 5 is a front and edge view of a detached spring-gate, as when constructed without its stud-locking capacity. Fig. 6 is a front and edge view of the releasing rod or bar shown in Fig. 2 detached from the steel. Fig. 7 is an edge view of the steel shown in Fig. 2, on which the clasp-plates are mounted. Fig. 8 illustrates in side view a clasp-plate and its spring integrally formed from one piece of sheet metal. Fig. 9 illustrates in side and edge views a releasing rod as constructed for locking all of the spring-gates in their closed position. Fig. 10 illustrates in two views a spring-gate, which is normally open, and a sliding rod, which closes said gate or permits it to open, as distinguished from the gate shown in Fig. 2, which is opened by a rod and permitted to close. Figs. 11 and 12 illustrate a spring gate, as in Figs. 2 and 5, on a steel, and provided with a pivoted wedge controlled by a rod or cord. Figs. 13 and 14 illustrate in several views two styles of stud as employed by me.

It is to be understood that steels having clasps embodying my improvements may be employed in various connections—as, for instance, in leggins—although I have illustrated them as constructed for use in corsets.

The clasp-plate steel A and stud-steel A' may be widely varied in form, and otherwise, without departure from my invention, provided they be adapted to receive and properly operate with clasp-plates and studs constructed and arranged in accordance with my invention.

In Figs. 2 to 7, inclusive, I have illustrated my improvements in what I deem their best form.

The clasp-plate steel A, as here shown, is provided with four stud-retaining devices, and although those at the top and bottom of the steel differ somewhat in construction from those intervening, I will first describe them all so far as they are similarly constructed. The clasp-plates $a$, in each case, are firmly secured at their rear ends to the steel, as usual, by rivets. Each plate has the usual stud-receiving eye, $a'$, and a retaining slot or eye, $a^2$, which may be of any of the usual forms; but it has a gateway, $a^3$, wide enough to admit of the passage of the shank of a stud of proper size to use therewith. For obtaining the best results the outer end of the slot $a^2$ is inclined outwardly slightly; but it may be at right angles to the sides of the slot, or even reversely inclined, without departure from my invention, as such variations would only involve a little extra manipulation of the corset steels while releasing the studs.

The gated clasp plate has its gateway guarded by a gate, $b$, which can be variably constructed without departure from my invention, provided it be organized to move in a plane at right angles to the plane occupied by the clasp-plate and the steel, so that when said gate is lifted or permitted to rise a stud can pass with its shank through the gateway and with its head beneath the gate. Said gate in its best form is composed of spring metal, so as to possess an inherent capacity for movement in one direction, the flexibility of the metal enabling the movement of the gate as if it were hinged at its rear end to the steel. Said gate $b$ may be formed integrally with the clasp-plate $a$; but it is preferably separately constructed and separately secured to the corset-steel, as shown in Fig. 2; but in either case the gate and plate constitute a complete stud-retaining clasp when properly mounted upon a steel.

Each of the upper and lower spring-gates $b$ (shown in Figs. 2 and 4) has upon its outer end and side a finger, $b'$, which overlies the outer end of the gated clasp-plate, and said finger is recessed on its inner surface and is provided with a shoulder, $b^2$, Fig. 4, which serves as an abutment for engaging with the edge of the head of a stud, and locking it against a rearward movement in the retaining-slot toward the receiving-eye $a'$. This locking-shoulder is specially desirable upon the upper and lower clasps of each pair of steels.

As so far described it will be understood that the gates $b$ are normally closed, and that to open them they must be lifted or moved outwardly, and it will be readily seen that this may be accomplished by means of a wedge or inclined plane introduced between them and the steel on which they are mounted at a proper point between their rivets and the edge of the steel. As shown in Figs. 2, 6, and 7, several wedges, $c$, are integral, or they may be coupled longitudinally together, so as to constitute a releasing rod or bar, $d$, which is mounted on the steel A, so as to freely slide longitudinally thereon, it being guided by suitable loops or guides, $d'$. These wedges may be otherwise organized for lifting said gates without departure from certain features of my invention—as, for instance, as shown in Figs. 11 and 12, wherein the wedge $c$ is hook-shaped, and is pivoted at its rear end to the steel, so that when vibrated, as by pulling a rod or cord, $d^2$, it will be forced between the gate and the steel and cause the gate to be lifted as when the sliding wedge is employed.

I have hereinbefore indicated that the gated plate and its gate may be formed from one piece of sheet metal—as, for instance, as illustrated in Fig. 8—it being understood that in this case the outer portion of the gate $b$ should be straight at its upper edge, so as to reliably form one side of the retaining-slot $a^2$, it being obvious that when said gate is made separately, as in Fig. 2, it does not need to serve as one side of said slot, because, as seen in Fig. 3, the gated plate itself affords both sides of the retaining-slot from the receiving-eye to the gateway $a^3$.

I have also hereinbefore indicated that the spring-gate may be normally open, so that when pressure is applied thereto it will be closed and remain so until said pressure is removed. This arrangement of the gate is illustrated in Fig. 10, in which the gate $b$ stands slightly elevated at its outer end, thus leaving the gate open, except when said gate is depressed by means of the sliding rod $d$, which is curved or bent laterally opposite the gate near its rear end, thus enabling said rod when moved longitudinally in one direction to readily depress and close the gate and maintain or lock it in its closed position, it being obvious that when thereafter the rod is moved in the opposite direction the gate will be permitted to rise or move outwardly and open the gateway for the passage of a stud. With this form of rod it will be seen that the wedge-like action before described is apparent; but in this case it is applied to the outer surface of the gate instead of between its inner surface and the steel. This locking of the gate in its closed position is of consequence, especially at the upper and lower ends of a steel, and is as readily provided for with a spring-gate which is normally closed as with the gate last described—as, for instance, in Figs. 2 and 6 the rod $d$ has not only the lifting-wedges $c$, but also the inclined locking-fingers $c'$, which when the wedges are not in service overlie the spring-gate and so bear upon its upper side as to confine or lock the gate in its closed position.

For use with either of the forms of gated clasps shown the studs $e$ should be so constructed that while each head $e'$ shall afford a good and reliable engagement with the clasp-plate when in the retaining-slot it cannot interfere with the free movement of the gate, and therefore the head $e'$ of each stud at one side, as at $e^2$, is squared up flush with the adjacent side of the shank $e^3$, and said flush side is located in line with the lower edge of the retaining-slot. The stud-heads $e'$ may be semicircular in outline, as shown in Fig. 13, or nearly square, as shown in Fig. 14, or in any other form, provided the requirements indicated are substantially observed.

As seen in Fig. 1, I have provided cords $f$ and $f'$, respectively applied to the upper and lower ends of the releasing-rod, for conveniently imparting to the latter the longitudinal movements requisite for properly operating the gates. While a cord or cords substantially as shown are deemed desirable, the releasing-rods may be provided with thumb-plates at either or both ends, or with levers or other well known mechanical appliances, without departure from my invention.

It will be obvious that a corset embodying the improvements described can be applied and removed by the wearer in the usual way, or that by pulling the cord upwardly the simultaneous release of all the studs can be readily accomplished, and it will be equally obvious that none of the strains incident to wear are borne by the gates or by the releasing-rod, and therefore said movable parts are but little liable to derangement, and the release of the studs is much more easily accomplished than would be the case if the releasing-rod were made to bear any portion of the distending strains to which corsets are ordinarily subjected.

While I prefer to embody in each set of clasps all of the several features of my invention, it is obvious that some of them may be independently employed in some one of the several forms shown.

Having thus described my invention, I claim as new and desire to secure by Letters Patent—

1. The combination, with the steel, of the open-gated clasp-plate having a gate movable from the gateway of said plate, in a plane at right angles to the plane of the steel, substantially as described.

2. The combination, with the steel, of the open-gated clasp-plate having a spring-gate which is movable in opening and closing the gateway of said plate, in a plane at right angles to the plane of the steel, substantially as described.

3. The combination, with the steel, of the several open-gated clasp-plates and their gates movable in planes at right angles to said steel, and wedges or inclined planes coupled together for simultaneous movement in controlling said gates and causing or permitting them to open or close the gateways of their respective clasp plates, substantially as described.

4. The combination, substantially as hereinbefore described, of the two steels, the gated clasp-plates, their gates, and their controlling wedges mounted, substantially as described, on one of said steels, and studs having heads which are flush with one side of their shanks, for enabling said gates to move in a plane parallel with the sides of said shanks, and thereby permitting the heads of the studs to pass beneath said gates and away from the clasp-plate.

5. The combination, with a gated clasp-plate, of a gate movable in a plane at right angles to the plane of the clasp and provided with a shoulder, by which a stud is locked within the retaining slot or eye of the clasp-plate, substantially as described.

6. The combination, with the steel, of the one or more gated clasp-plates, the spring-gates for each clasp, and the sliding rod embodying a wedge for lifting each spring-gate, substantially as described.

7. The combination, with the steel, of the gated clasp-plate, its gate, and the sliding rod provided with an inclined surface which overrides the gate and confines it in position, substantially as described.

8. A clasp-plate having an open gateway for the outward passage of the shank of a stud from a retaining-slot, and a gate in said gateway movable at right angles to the plane of the plate, and adapted to permit the head of a stud to pass beneath said gate in its outward passage from the clasp-plate, substantially as described.

MAX W. HENIUS.

Witnesses:
PHILIP F. LARNER,
HOWELL BARTLE.